United States Patent [19]
Goto

[11] 3,999,202
[45] Dec. 21, 1976

[54] AUTO-PROCESS CAMERA FILM PROCESSING APPARATUS

[75] Inventor: Toshio Goto, Omiya, Japan

[73] Assignee: Fuji Photo Film Co., Ltd., Minami Ashigara, Japan

[22] Filed: Apr. 3, 1975

[21] Appl. No.: 564,975

[30] Foreign Application Priority Data

Apr. 4, 1974   Japan .................... 49-38673

[52] U.S. Cl. .................... 354/304; 354/86
[51] Int. Cl.² .................... G03D 9/02
[58] Field of Search .................... 354/83, 84, 85, 86, 354/301, 303, 304, 305

[56] References Cited

UNITED STATES PATENTS

| | | | |
|---|---|---|---|
| 2,590,185 | 3/1952 | Land | 354/303 |
| 3,238,858 | 3/1966 | Eloranta | 354/84 |
| 3,327,599 | 6/1967 | Murphy | 354/301 |
| 3,683,770 | 8/1972 | Land et al. | 354/86 |
| 3,735,690 | 5/1973 | Thoenen | 354/85 X |
| 3,854,809 | 12/1974 | Driscoll | 354/86 |

Primary Examiner—Fred L. Braun
Attorney, Agent, or Firm—Sughrue, Rothwell, Mion, Zinn and Macpeak

[57] ABSTRACT

An auto-process camera film processing apparatus comprising first and second film unit processing rolls, the first roll being in fixed location, the second roll being moveable towards or away from the first roll, and one or both the rolls being driveable by a motor or similar device. The second roll is normally urged by a spring towards the first roll as far as permitted by a stop, which may be fixed or adjustable, and prevent the second roll from contacting the first roll, but permit the rolls to be brought into sufficient proximity to ensure efficient spreading of processing solution through a film unit passed between the rolls. Upon initial engagement of a film unit with the rolls the second roll is moved slightly away from the first roll by the leading edge portion of the film unit, thus avoiding jamming or damage to the film unit, after which the spring returns the second roll to a position to ensure correct processing of the film unit.

1 Claim, 5 Drawing Figures

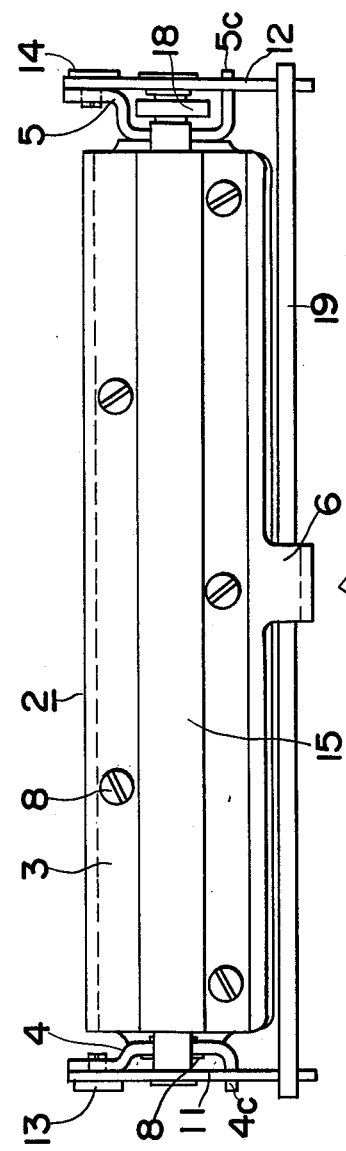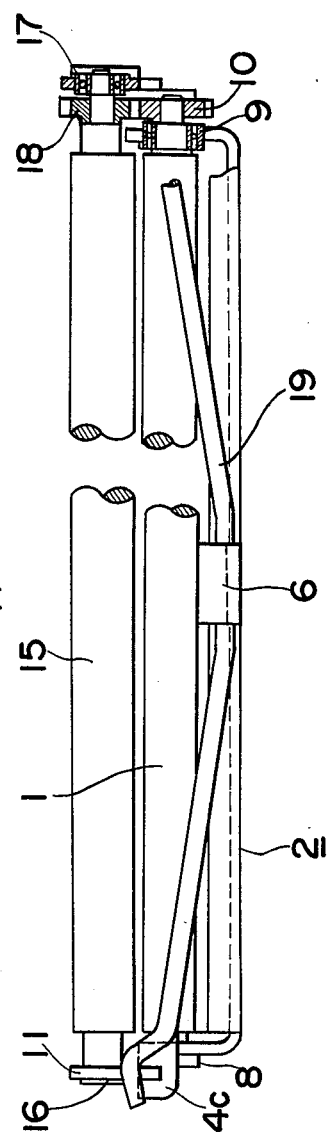
FIG. 2
FIG. 3

AUTO-PROCESS CAMERA FILM PROCESSING APPARATUS

BACKGROUND OF THE INVENTION

1. Field of the Invention

The present invention relates to an auto-process camera, and more particularly to means for processing film units in an auto-process camera.

2. Description of the Prior Art

There is known a photographic process, which is frequently referred to as auto-process, and according to which film is provided in the form of individual units, each of which units comprises at least a negative image layer exposable to produce a negative or latent image of an object, and a positive image layer on which a positive, viewable image corresponding to the image produced on the negative image layer may be formed under the influence of a developing and processing solution which is diffused through the film unit, it being also possible for film units to contain other layers, depending on film unit type and purpose. It is usual practice to provide processing solution in breakable pods which are embedded in the film unit structure near one end portion thereof, and to provide, in an associated camera, pressure means, which are suitably constituted by a pair of rolls, for breaking open the pods. After being loaded into a camera and exposed, a film unit is moved, with the film unit end containing the processing solution pods foremost, and brought into engagement with and drawn through pressure rolls, which break open the pod and cause extrusion of the processing solution and diffusion thereof through the film unit, the film unit being brought immediately afterwards to the exterior of the camera, there thus being made available a viewable print a very short time after exposure of the film unit, without making it necessary for a photographer to proceed to a separate, specially equipped location for development and processing of film. The film unit may be drawn through the processing rolls either by means of a leader, which is constituted by a strip of paper or similar material, and is attached at one end to the film unit and may be pulled manually, or by means of actuation of one or both the processing rolls by mechanical or electrical drive means provided in the associated camera. In the latter case means are provided in the camera to forward the exposed film unit from an exposure station to, and into engagement with the processing rolls, and the processing rolls also act to forward the film unit out of the camera, which offers the advantage, for the photographer, of ease of manipulation. In either case, it is essential that the pressure exerted by the processing rolls be sufficient to ensure efficient spreading of processing solution through the film unit, but at the same time it must be possible for the film unit to be fed smoothly into engagement with the rolls without risk of jamming or damage to the film unit, which is a comparatively weak element. In conventional means these two conditions are difficult to meet, since the leading end portion of a film unit is generally slightly thicker than the rest of the film unit because it must accommodate processing solution pods, and processing rolls are normally urged into contact with one another by spring means and must be forced apart slightly by a film unit being moved out of the camera. Thus, if the force of the spring means for urging the rolls together is such as to cause the rolls to apply optimum pressure for spreading solution through the main portion of the film unit, it is difficult to guarantee smooth feed-in of the leading edge portion of a film unit into engagement with the rolls. On the other hand, if the force of the spring means is made less so that smooth feed-in of a film unit between the rolls is always guaranteed, the pressure exerted by the rolls is liable to be insufficient to guarantee complete diffusion of processing solution through all parts of the film unit, thus resulting in incompletely developed portions and unsatisfactory photographs.

Accordingly, an essential object of the present invention is to provide a film processing means for use in an auto-process camera which always permits unhindered engagement of successive exposed film units with pressure means, while also ensuring efficient diffusion of processing solution through the film units with substantial elimination of the disadvantages inherent in the conventional film processing means.

Another important object of the present invention is to provide a film processing means of the above described type which is accurate and stable in functioning.

A further object of the present invention is to provide a film processing means of the above described type which is simple in construction and can be manufactured at low cost for incorporation into an auto-process camera.

SUMMARY OF THE INVENTION

According to the invention, there is provided a film processing means comprising a pair of rolls, of which a first roll is rotatably mounted on and supported by first, fixed support elements, and of which the second roll is rotatably mounted on and supported by second support elements which are provided in pivotal attachment to the fixed, first support elements, whereby the second roll may be moved away from or towards the first roll. Upon termination of exposure of a film unit, one or both the rolls is rotated by drive supplied thereto by motor means for example. The second roll is normally urged, by spring means acting on the pivotal second support elements, towards the first roll but may not be moved into complete contact therewith because of stop elements which are mounted on the first support elements and are contactable by second support element projections, and there is thus always a slight clearance between the rolls, However, the stop elements allow the spring means to bring the rolls close enough together to ensure efficient spreading of processing solution through a film unit passed through the rolls. Suitable clearance between the processing rolls is easily determined for a particular type of film unit and is easily set by suitable location of the stop elements. According to different embodiments of the invention the stop elements may be fixed at one setting, or may be adjustable and fixable at different settings, to effect different clearances between processing rolls. When an exposed film unit first reaches the location of the rolls, the film unit leading edge portion causes the second roll to move away slightly from the first roll, counter to the force of the spring means. Although the leading end portion of a film unit is comparatively thick, risk of jamming or damage to a film unit during feed-in thereof into engagement with the rolls is eliminated since there is already a slight clearance between the rolls, and also because in order to separate the rolls the film unit only needs to exert the force necessary to effect pivoting of the second roll support elements, i.e., the force is less than that required to be exerted by a film unit acting against spring means having a line of action more or less normal to the line of film unit advance. After the film unit leading edge portion passes the rolls, the spring means move the second roll back towards its position of minimum distance from the first roll, whereby the film unit main body is compressed between the rolls and processing solution is spread therethrough, as the film unit is forwarded to the exterior of the camera. In this manner processing of film units is effected efficiently and smoothly.

These and other objects and features of the present invention will become apparent from the following description taken in conjunction with the preferred embodiment thereof with reference to the accompanying drawings, in which;

BRIEF DESCRIPTION OF THE DRAWINGS

FIGS. 2, 3 and 4 are respectively top, front, and end views showing the processing means of FIG. 1 in an assembled condition.

DESCRIPTION OF PREFERRED EMBODIMENTS

Figure 1:
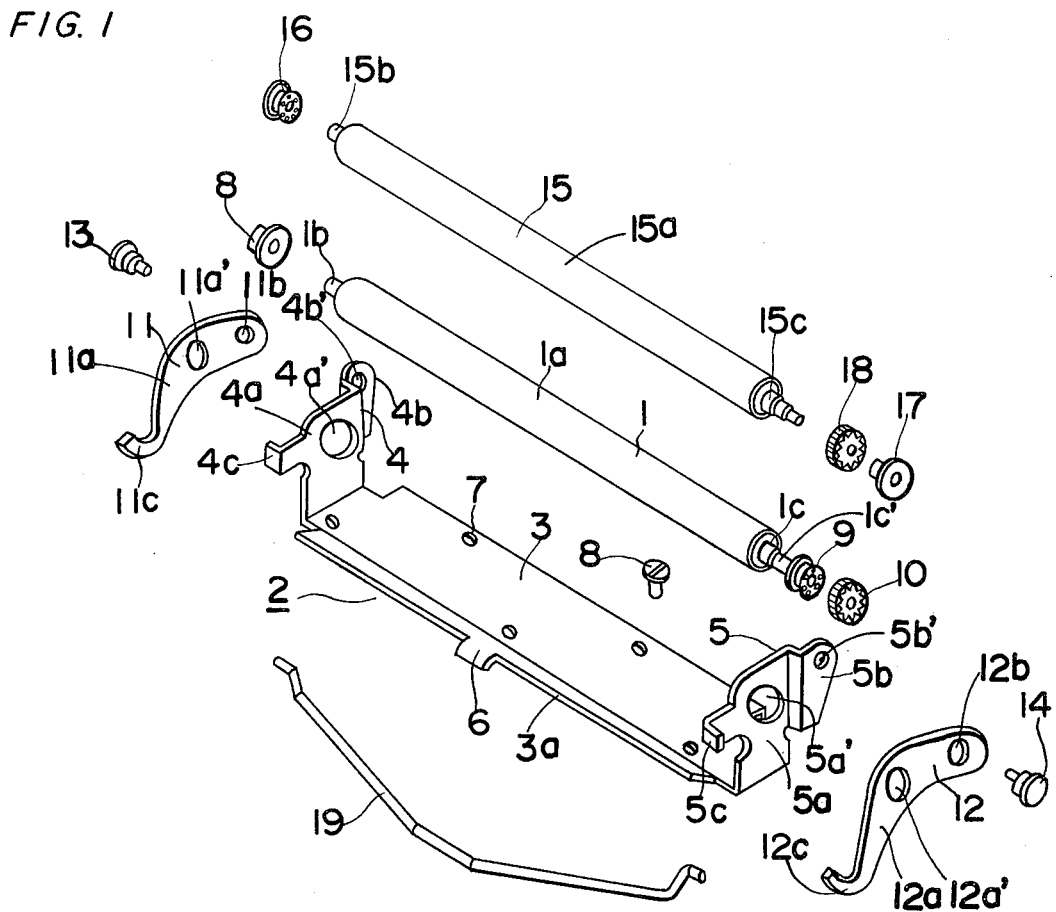
FIG. 1 is an exploded view of a film processing means according to the invention.

Referring to FIGS. 1 through 3, the processing means or mechanism, which is generally indicated at 2, comprises base plate 3, first support elements 4 and 5, second support elements 11 and 12, and first and second processing rolls 1 and 15, and is situated in a camera in a position intermediate an exposure station whereat successive film units loaded in the camera are correctly held in position for exposure and an exit through which successive exposed film units are moved to the exterior of the camera. Upon exposure of each successive film unit, it is moved, by known means which are not part of this invention, to the processing means 2, which is actuated at this time and serves to simultaneously process the film unit while forwarding it to the exterior of the camera.

The base plate 3 is rectangular, comparatively narrow, and is somewhat longer in width than the width of a film unit to be processed and is fixedly attached to an interior portion of the camera by means of screws 8 which fit through suitably disposed holes 7 in the main plate 3. The inside long edge 3a of the base plate 3, i.e., the long edge thereof which is nearer to the film unit exposure station and is reached first by a film unit being removed from the camera, is inclined upwards slightly, and has in integral or fixed attachment to a central portion thereof, a downwardly curved press-down flap 6. The base plate inside long edge 3a and press-down flap 6 serve to guide an exposed film unit into the processing means 2, the film unit sliding over the top thereof, and the press-down flap 6 further serves to hold a spring means 19, described below, in place. The first support elements 4 and 5 are provided in integral attachment to and extend upwards at right-angles from opposite short edges of the base plate 3. The first support element 4 comprises a main wall portion 4a wherein there is formed a circular hole 4a'. A narrow intermediate wall is provided in integral attachment to, and at right-angles to the rear edge of the main wall portion 4a, i.e., the edge thereof nearer to the film unit exit of the camera. This intermediate wall extends outwardly with respect to the processing means 2, i.e., away from the opposite first support element 5, and has in integral attachment to the outer edge thereof a mounting flap 4b, which extends at right-angles rearwardly therefrom, the flap 4b thus being stepped-off or offset with respect to and parallel to the line of the main wall portion 4a. In the flap 4b there is formed a small mounting hole 4b'. A right-angled projection piece having an outer end portion which extends outwardly with respect to the processing means 2 and constitutes a stop piece 4c is integrally attached to the front edge of the main wall portion 4a. Similarly, the other first support element 5 comprises a main wall portion 5a, mounting flap 5b, and stop piece 5c, there being formed holes 5a' and 5b' in the main wall portion 5a and mounting flap 5b, respectively.

The first processing roll 1 comprises a main portion 1a which is slightly longer than a film unit to be processed and contacts a film unit passed through the processing means 2, and integral end projections 1b and 1c, which are smaller in diameter than, coaxial with, and provided at opposite ends of the main portion 1a. The roll end projections 1b and 1c respectively are rotatably mounted in bearings 8 and 9 which are respectively accommodated in the holes 4a' and 5a' of the first support element main wall portions 4a and 5a. One roll end projection, 1c in the drawings, projects completely through its corresponding bearing 9 to the outer side of the main wall portion 5a of the first support element 5, and is in integral attachment to an outer end extension 1c' which has a diameter slightly smaller than that of the end projection 1c, and on which there is fixedly mounted a drive gear 10. The gear 10, which is suitably held in position by means of a gear seat portion fixed to the outer surface of the roll end projection 1c, and may be provided with an outside cap, is connected through suitable means to and is rotatable by a roll drive motor (not shown).

The second support element or arm 11 comprises a main portion 11a and a generally dipper-shaped projection 11c extending forwardly from the main portion 11a, i.e., towards the film unit exposure station of the camera. In a generally central portion of the main portion 11a there is formed a roll mount hole 11a' and in a rear end portion thereof there is formed another, somewhat smaller hole 11b. The second support element 11 is mounted in pivotal attachment to the first support element 4 by means of a pin 13 which passes through the second support element hole 11b and the hole 4b' in the mounting flap 4b of the first support element 4. The other second support element or arm 12 has a construction identical to that of the element 11, comprises holes 12a' and 12b and a dipper-shaped projection 12c, and is similarly mounted in pivotal attachment to the first support element 5 by means of a pin 14 which passes through the second element support hole 12b and the hole 5b' in the mounting flap 5b of the first support element 5.

The second processing roll 15 has a main portion 15a which has dimensions generally equal to those of the first roll main portion 1a, contacts a film unit passed through the processing means 2, and at one end connects to an integral, smaller diameter, coaxial projection 15b which is rotatably mounted in a bearing 16 fitted in the central hole 11a' of the second support element 11. The other end of the main portion 15a connects to an integral, coaxial extension 15c, which is constituted as three successively smaller diameter portions. The outermost end portion of the extension 15c is rotatably mounted in a bearing 17, which is accommodated in the central hole 12a' of the second support element 12. On the intermediate portion of the extension 15c, which lies on the inner side of the second support element 12 and is in line with the outer end extension 1c' of the first roll 1, there is fixedly mounted a gear 18 which is suitably held in place by a gear seat portion affixed to the outer surface of the largest portion of the extension 15c. The gear 18 has the same dimensions and number of teeth as, and is engaged by the gear 10 mounted on the extension 1c' of the first roll 1, whereby drive from the roll drive motor may serve to rotate both rolls 1 and 15 simultaneously and at the same speed.

Figure 4:
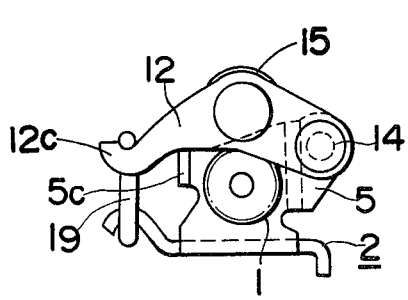

Still referring to FIGS. 1 through 3 and also referring to FIG. 4, the second roll 15 may be moved towards or away from the first roll 1 by pivotal motion of the second support elements 11 and 12, counterclockwise or clockwise as seen in FIG. 4. The nearest position where the second roll 15 can be brought to the first roll 1 is determined by the stop pieces 4c and 5c of the first support elements 4 and 5, which stop pieces 4c and 5c are contacted by the lower sides of the dipper-shaped projections 11c and 12c of the second support elements 11 and 12, and thus prevent more than a predetermined amount of counterclockwise movement of the second support elements 11 and 12. When the second support elements 11 and 12 are in their most counterclockwise positions, whereby the second roll 15 is brought to its position of maximum proximity to the first roll 1, the rolls 1 and 15 are separated by a clearance C. The dimensions of the second support elements 11 and 12 and the setting of the stop pieces 4c and 5c are such that, presuming application of pressure to urge the second roll 15 to its position of maximum proximity to the first roll 1, the clearance C is sufficiently small to ensure that the rolls 1 and 15 may spread processing solution completely and efficiently through a film unit which is passed therebetween. The second roll 15 is constantly urged towards its position of maximum proximity to the first roll 1 by the abovementioned spring means 19, which is in the form of a curved bar spring extending between opposite sides of the processing means 2 and having a center portion thereof held under the press-down flap 6 projecting from the base plate 3. Opposite ends of the spring means 19 define upturned hooks, one of which is latched onto the upper side of the dipper-shaped projection 11c of the second support element 11, and the other of which is latched onto the projection 12c of the other second support element 12. Since the spring means 19 is formed symmetrically about its center portion which is tightly held under the press-down flap 6, the former exerts equal pressure on the projections 11c and 12c of the second support element 11 and second support element 12, respectively, this pressure acting to turn the elements 11 and 12 counterclockwise so as to contact the stop pieces 4c and 5c of the first support elements 4 and 5. The center portion of the spring means 19 may be affixed to, or simply held by spring pressure to the lower side of the press-down flap 6. Being curved, the spring means 19 does not hinder advance of a film unit into the processing means 2.

Action of the abovedescribed means is as follows. The second roll 15 is normally held by the force of the spring means 19 in a position such that there is only a clearance C between the rolls 1 and 15. Upon termination of exposure of a film unit at the camera exposure station, the film unit is advanced to the processing means 2, the roll drive motor is actuated to rotate the gear 10 and the first roll 1, and the gear 10 rotates the gear 18 and second roll 15. The film unit is slid over the press-down flap 6 and base plate leading edge 3a and guided into line with the clearance C. As the film unit continues to be forwarded into the clearance C, the second roll 15 is pushed upwards and the second support elements 11 and 12 are caused to pivot clockwise slightly by the thick leading edge portion of the film unit, which leading edge portion is thus permitted to come into unhindered engagement with the rolls 1 and 15. Actuation of the means to forward the film unit from the exposure station to the processing means 2 may be terminated at or shortly after this stage, since the rolls 1 and 15 are rotating and serve to draw the film unit towards the film unit exit of the camera. While the leading edge portion of the film unit is between the rolls 1 and 15, pressure exerted by the spring means 19 breaks open processing solution pods provided in the film unit leading edge portion.

The tooth contour and size of the gears 10 and 18 are made such that the gear 18 remains engaged and driven by the gear 10 even at maximum displacement of the second roll 15 from the first roll 1. Strictly speaking, during this displacement the second roll 15 moves over a curved arc. However, since the amount of displacement is very small, movement of the second roll 15 may be considered to be effectively in a straight line. Possibility of interference of teeth of the gears 10 and 18 during movement of the second roll 15 is avoided by imparting a suitably large pressure angle to the gear teeth.

When the leading edge portion of the film unit has passed completely through the rolls 1 and 15, the spring means 19 pivots the second support elements 11 and 12 counterclockwise again and the second roll 15 is again brought to, or almost to, its position of maximum proximity to the first roll 1, and the rolls 1 and 15 continue to rotate to forward the film unit towards the exterior of the camera while applying pressure to spread processing solution therethrough. Thus, successive film units may be efficiently processed, but without risk of hindrance to initial engagement thereof with processing rolls. It is to be noted that compared with conventional means the force required to be exerted by the spring means 19 is less, since the spring means 19 in effect acts through levers which are constituted by the projections 11c and 12c of the second support elements or arms 11 and 12, and also that there is less wear of the spring means 19, since there is an initial clearance C between the rolls 1 and 15 and so the second roll 15 needs to be moved a smaller distance to permit passage of the thick leading edge portion of a film unit.

Figure 5:
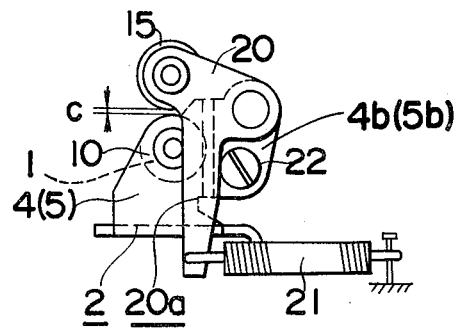
FIG. 5 is an end view of a film processing means according to another embodiment of the invention.

FIG. 5 shows another embodiment of the invention wherein like elements carry like numerical disignations and there are provided second support elements 20 and positioning of the second support elements 20 is effected by means of compression springs 21 and stop elements 22, there being one spring 21 and one stop element 22 associated with each of the second support elements 20. Each of the second support elements 20 has the general form of a crank lever having a first arm, which has one end pivotally mounted on a first support element 4 or 5, and whose other end provides rotatable support for the second roll 15, and a second arm 20a which extends downwards from a generally central portion of the first arm, and to whose outer, lower end is suitably attached one end of a compression spring 21. The other end of the spring 21 connects to a fixed point in the camera rearward of the second support element 20, whereby the spring 21 acts to move the second roll 15 towards the first roll 1. The associated stop element 22 is constituted by an excentrically rotatable cam element which is mounted on the flap, 4b or 5b, of the corresponding first support element 4 or 5, and may be rotated to and fixed at different positions. In this embodiment of the invention therefore, by moving the stop elements 22 to different settings, the second roll 15 may be allowed to approach the first roll 1 to a greater or lesser degree, and the standard clearance C between the rolls 1 and 15 may be varied in accordance with different types of film unit employed.

It is to be noted that the film processing means of the invention is not limited to the above described embodiments, but can be modified in various ways within the scope of the invention. For example, roll drive may be supplied to the first roll 1 only, and the gear 10 may be provided alone, without need of provision of the gear 18, or instead of the gear 18 being driven by the gear 10, drive from a roll drive motor or similar means may be transmitted individually to the gears 10 and 18. Alternatively, if the processing means is used in association with film units which are withdrawn manually from a camera by means of leaders, the gears 10 and 18 and associated roll drive means may be dispensed with, since rotation of the rolls 1 and 15 is effected by manual action.

As is clear from the foregoing description, according to the film processing means of the invention, since the distance or clearance between the first and second rolls is maintained at a predetermined degree, which is optimum to feed the leading edge of a film unit smoothly between the two rolls, with at least one of the rolls held elastically against the other, no excessively large force of reaction is exerted on the rolls themselves, by which arrangement, smooth rotation of the rolls can be ensured. Furthermore, the spring means acting on the second supporting means for urging the second roll towards the first roll through the lever principle can be of relatively small biasing force as compared with the case where the roll is directly urged, so that less load is applied to the spring means, thus lengthening life of the spring means with possibility of breakage thereof reduced to a large extent.

Although the present invention has been fully described by way of example with reference to the attached drawings, it is to be noted that various changes and modifications are apparent to those skilled in the art. Therefore, unless otherwise, such changes and modifications depart from the scope of the present invention, they should be construed as included therein.

What is claimed is:

1. In an auto-process camera which employs film in the form of individual immediately processable film units, each of said film units including at least a negative image layer exposable to produce a negative image of an object and a positive image layer on which a positive viewable image corresponding to the image produced on the negative image layer may be formed under the action of processing solution diffused through the film unit, and at least one breakable pod containing processing solution at a leading edge portion thereof, and which comprises means for forwarding successive exposed film units from an exposure station to a film processing means and an exit permitting extraction of successive exposed and processed film units from said camera, the improvement wherein said film processing means comprises:
   a fixed base element having width larger than the width of said film unit,
   first support elements which are in fixed attachment to said base element,
   first processing roll means rotatbly mounted on and supported by said first support elements,
   second support elements pivotally mounted on said first support elements,
   second processing roll means rotatably mounted on and supported by said second support elements with its axis generally parallel to said first roll means,
   spring means urging said second support elements to pivot in a first direction to bring said second roll means towards said first roll means,
   stop means contactable by said second support elements to prevent said second support elements from moving more than a predetermined amount in said first direction to provide a predetermined minimum clearance between said first roll means and said second roll means and said stop means being so located that said second roll means may be brought into sufficient proximity to said first roll means to ensure complete spreading by said first and second roll means of processing solution through a film unit passed between said first and second roll means,
   roll means drive means,
   drive transmission means connecting said drive means to at least one of said roll means, and
   wherein said stop means is constituted by eccentrically rotatable cam members provided on said first support elements and being fixable at different rotary positions, whereby said second roll means may be brought to different degrees of proximity to said first roll means in accordance with the type of film units employed in said camera.

* * * * *